US012665115B2

(12) United States Patent
Ebara

(10) Patent No.: US 12,665,115 B2
(45) Date of Patent: Jun. 23, 2026

(54) SUPERCONDUCTING MAGNET DEVICE

(71) Applicant: SUMITOMO HEAVY INDUSTRIES, LTD., Tokyo (JP)

(72) Inventor: Yuta Ebara, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 173 days.

(21) Appl. No.: 18/661,623

(22) Filed: May 11, 2024

(65) Prior Publication Data

US 2025/0029762 A1 Jan. 23, 2025

(30) Foreign Application Priority Data

Jun. 7, 2023 (JP) ................................ 2023-094082

(51) Int. Cl.
*H01F 6/06* (2006.01)
*H01F 6/02* (2006.01)
*H01F 6/04* (2006.01)

(52) U.S. Cl.
CPC ............... *H01F 6/065* (2013.01); *H01F 6/02* (2013.01); *H01F 6/04* (2013.01)

(58) Field of Classification Search
CPC ............ H02H 9/00; H02H 7/00; H02H 7/001; H02H 11/004; H01F 6/02; H01F 6/06; H01F 6/04; H01F 6/065; H01F 6/00; Y02E 40/60
USPC ............................................................ 361/19
See application file for complete search history.

(56) References Cited

U.S. PATENT DOCUMENTS 6,147,844 A * 11/2000 Huang .................. H02H 7/001 361/19
6,977,571 B1 * 12/2005 Hollis ................ G01R 33/3875 324/319

FOREIGN PATENT DOCUMENTS

JP 2007-234689 A 9/2007

* cited by examiner

*Primary Examiner* — Danny Nguyen
(74) *Attorney, Agent, or Firm* — WTA IP Law P.C.

(57) ABSTRACT

A superconducting magnet device includes a superconducting coil, a quenching protection circuit that is connected in parallel to the superconducting coil and that allows a current in one direction, and an excitation power supply that is connected to the superconducting coil with proper polarity determined such that a current flows in the one direction to the quenching protection circuit when quenching occurs in the superconducting coil, and excites the superconducting coil. The excitation power supply is configured to detect incorrect connection with the superconducting coil when the excitation power supply is connected to the superconducting coil with a polarity opposite to the proper polarity.

7 Claims, 6 Drawing Sheets

10

SUPERCONDUCTING MAGNET DEVICE

CROSS-REFERENCE TO RELATED APPLICATIONS

This application claims priority to Japanese Patent Application No. 2023-094082, filed on Jun. 7, 2023, which is incorporated by reference herein in its entirety.

BACKGROUND

Technical Field

A certain embodiment of the present invention relates to a superconducting magnet device.

Description of Related Art

An undesired phenomenon that may occur during the operation of a superconducting magnet device is thermal runaway (quenching) of a superconducting coil. When quenching occurs, the superconducting coil transitions from a superconducting state to a normal conducting state, and resistance is generated inside the coil. A large Joule heat can be generated from a large current flowing through the coil in the superconducting state up to that point. An increase in voltage within the coil and the resulting discharge may also occur. In addition, a large electromagnetic force can act on the superconducting coil due to a transient current unbalance when quenching occurs. An eddy current is also generated in a conductor disposed in the vicinity of the coil, and an electromagnetic force can act on the conductor. The heat, discharge, and electromagnetic force that can be generated in this manner can damage the superconducting coil and surrounding structures and devices.

Generally, the superconducting magnet device is provided with a protection circuit for protecting the superconducting coil when quenching occurs. As an example of the protection circuit, there is a case in which a pair of diodes connected in parallel with opposite polarities are connected in parallel with a superconducting coil. The protection circuit is usually disposed in a cryogenic environment together with the superconducting coil and cooled to the same temperature. (for example, the related art)

SUMMARY

According to an embodiment of the present invention, there is provided a superconducting magnet device including: a superconducting coil; a quenching protection circuit that is connected in parallel to the superconducting coil and that allows a current in one direction; and an excitation power supply that is connected to the superconducting coil with proper polarity determined such that a current flows in one direction to the quenching protection circuit when quenching occurs in the superconducting coil, and excites the superconducting coil. The excitation power supply is configured to detect incorrect connection with the superconducting coil when the excitation power supply is connected to the superconducting coil with a polarity opposite to the proper polarity.

According to another embodiment of the present invention, there is provided the superconducting magnet device including: a superconducting coil; a quenching protection circuit that is connected in parallel to the superconducting coil and that allows a current in one direction; an excitation power supply that is connected to the superconducting coil with proper polarity determined such that a current flows in one direction to the quenching protection circuit when quenching occurs in the superconducting coil, and excites the superconducting coil; and a coil-side positive terminal and a coil-side negative terminal connected to the superconducting coil. The excitation power supply includes a power supply-side positive terminal connected to the coil-side positive terminal and a power supply-side negative terminal connected to the coil-side negative terminal. The coil-side positive terminal is configured to be disconnected from the power supply-side negative terminal, and the coil-side negative terminal is configured to be disconnected from the power supply-side positive terminal.

DETAILED DESCRIPTION

Figure 1:
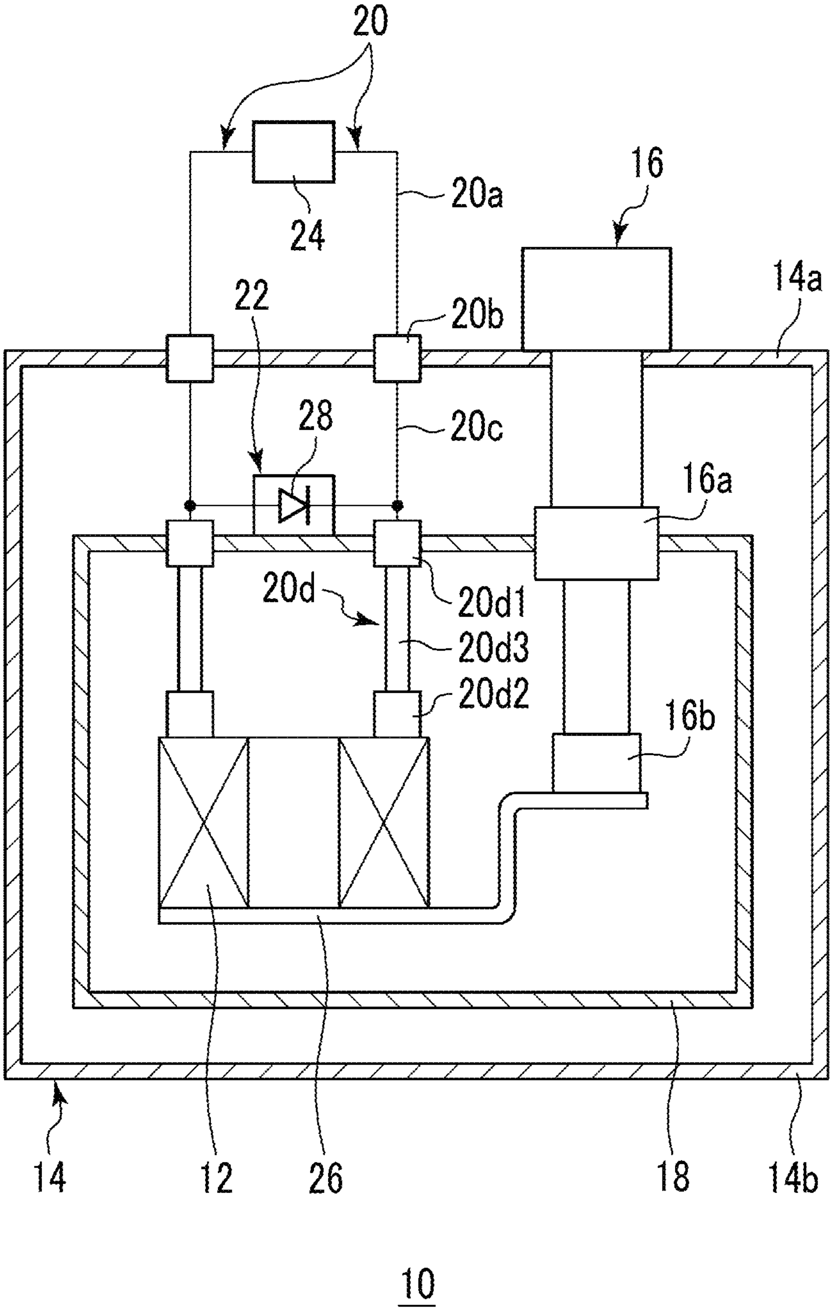
FIG. 1 is a diagram schematically showing a superconducting magnet device according to an embodiment.

As a result of intensive studies on the protection circuit of the superconducting magnet device, the present inventor has come to recognize the following problems. Diodes that are guaranteed to operate at cryogenic temperatures are more expensive than general-purpose diodes that are not guaranteed to do so. When the pair of diodes described above are replaced with a single diode in the quenching protection circuit, the number of diodes used is halved, which is advantageous in reducing the cost of the device. In this case, due to the design of the superconducting magnet device, a direction of the current flowing through the superconducting coil in a normal operation (that is, in a state where quenching does not occur in the superconducting coil) needs to be predetermined such that when quenching occurs, a current flows in a forward direction from this coil to the diode. The superconducting coil and a power supply thereof are required to be connected to each other with correct polarity such that the superconducting coil and the power supply thereof can operate in this manner.

However, the present inventor realizes that there is a risk of incorrectly connecting the superconducting coil and the power supply with opposite polarities, when these are connected, such as when the superconducting magnet device is manufactured or installed at a site where the superconducting magnet device is used. When such incorrect connection is made, a current flows through the superconducting coil in a direction opposite to a correct direction in a normal operation. Then, when quenching occurs, a current flowing from the superconducting coil toward the diode tends to flow in a reverse direction of the diode. That is, as a result of the incorrect connection, the operation of the quenching protection circuit may be hindered. When the protection circuit does not operate, as described above, there is an increased risk of damage to the superconducting magnet device when quenching occurs, which is undesirable.

It is desirable is to handle incorrect connection of the polarity between a superconducting coil and a power supply thereof.

Hereinafter, an embodiment for carrying out the present invention will be described in detail with reference to the drawings. In the description and the drawings, the same or equivalent components, members, and processes will be represented by the same reference numerals, and overlapping description will be omitted as appropriate. The scale or shape of each part that is shown in the drawings is conveniently set for ease of description and is not to be interpreted as limiting unless otherwise specified. The embodiments are exemplary and do not limit the scope of the present invention in any way. All features described in the embodiment or combinations thereof are not necessarily essential to the present invention.

Figure 2:
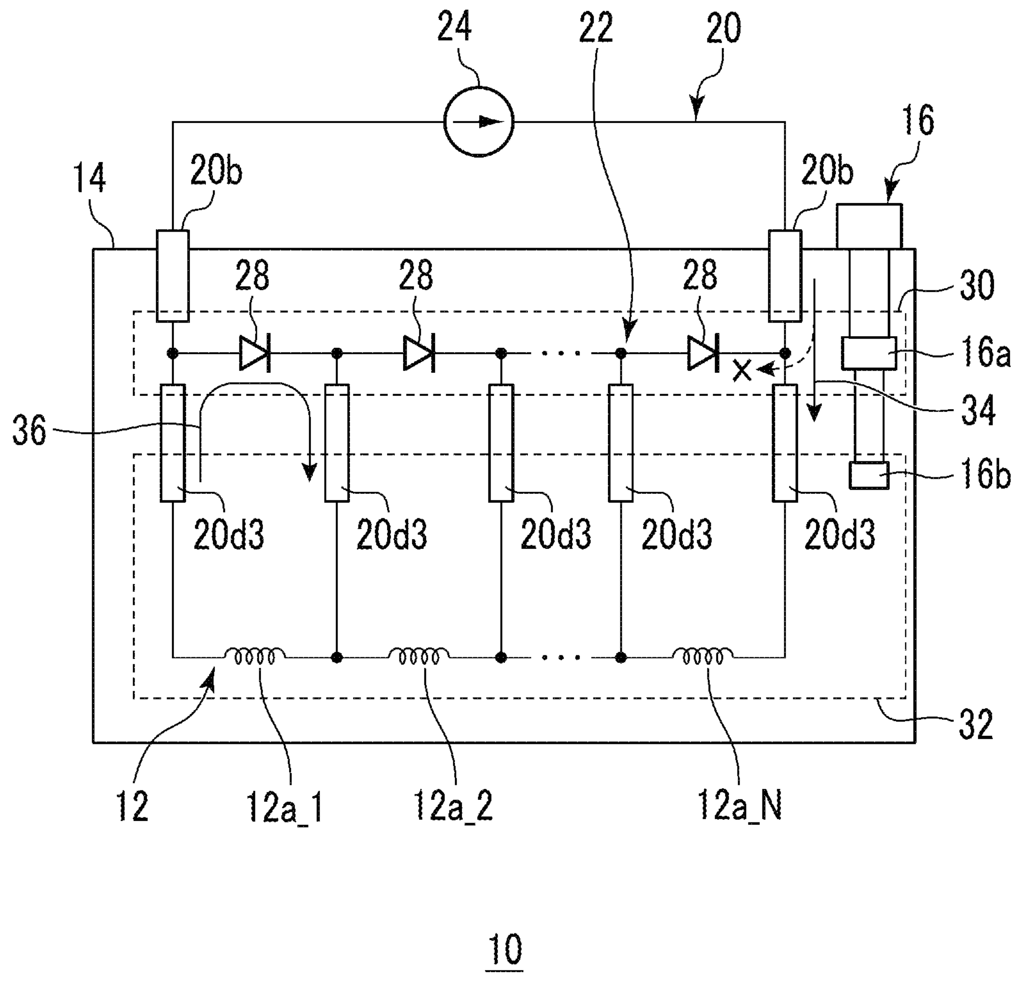
FIG. 2 is a diagram schematically showing the superconducting magnet device according to the embodiment.

FIGS. 1 and 2 are diagrams schematically showing a superconducting magnet device 10 according to an embodiment. The superconducting magnet device 10 can be mounted on a high-magnetic field utilization device as a magnetic field source of, for example, a single crystal pulling device, a nuclear magnetic resonance (NMR) system, a magnetic resonance imaging (MRI) system, an accelerator such as a cyclotron, a high energy physical system such as a nuclear fusion system, or other high-magnetic field utilization devices (not shown), and can generate a high magnetic field required for the device.

The superconducting magnet device 10 includes a superconducting coil 12, a vacuum chamber 14, a cryocooler 16, a heat shield 18, an electric current introduction line 20, a quenching protection circuit 22, and an excitation power supply 24.

The superconducting coil 12 is disposed inside the vacuum chamber 14, and is configured to generate a strong magnetic field by being energized in a state of being cooled to a cryogenic temperature equal to or lower than a superconducting transition temperature. The superconducting coil 12 may be a known superconducting coil (for example, a so-called low-temperature superconducting coil). The superconducting coil 12 is connected to the excitation power supply 24 disposed outside the vacuum chamber 14 via the electric current introduction line 20. An exciting current is supplied from the excitation power supply 24 to the superconducting coil 12 through the electric current introduction line 20. In this way, the superconducting magnet device 10 can generate a strong magnetic field.

The vacuum chamber 14 is an adiabatic vacuum chamber that provides a cryogenic vacuum environment suitable for bringing the superconducting coil 12 into a superconducting state, and is also called a cryostat. Typically, the vacuum chamber 14 has a columnar shape or a cylindrical shape with a hollow portion in a central portion thereof. Therefore, the vacuum chamber 14 includes a substantially flat circular or annular top plate 14*a* and bottom plate 14*b*, and a cylindrical side wall (cylindrical outer peripheral wall, or coaxially disposed cylindrical outer peripheral wall and inner peripheral wall) connecting the top plate 14*a* and the bottom plate 14*b*. The cryocooler 16 may be installed on the top plate 14*a* of the vacuum chamber 14. The vacuum chamber 14 is formed of, for example, a metal material such as stainless steel or other suitable high-strength materials to withstand an ambient pressure (for example, atmospheric pressure).

The cryocooler 16 is configured to cool the heat shield 18 and the quenching protection circuit 22 to a first cooling temperature, and to cool the superconducting coil 12 to a second cooling temperature lower than the first cooling temperature. In this embodiment, the cryocooler 16 is a two-stage Gifford-McMahon (GM) cryocooler, and includes a first cooling stage 16*a* and a second cooling stage 16*b*. The first cooling stage 16*a* and the second cooling stage 16*b* are provided so as to surround a first expansion space and a second expansion space in the cryocooler 16, respectively, and are formed of a metal material such as copper or another material having a high thermal conductivity. The first cooling temperature may be in a temperature range of about 20K to about 100K, for example, a temperature range of about 30K to about 50K, and the second cooling temperature may be in a temperature range of about 3K to about 20K, for example, about 4K.

The heat shield 18 is disposed so as to surround the superconducting coil 12 within the vacuum chamber 14. The heat shield 18 is formed of, for example, a metal material such as copper or another material having a high thermal conductivity. The heat shield 18 is directly attached to the first cooling stage 16*a* of the cryocooler 16, and is thermally coupled to the first cooling stage 16*a*. Alternatively, the heat shield 18 may be attached to the first cooling stage 16*a* via a heat transfer member having flexibility or stiffness. During the operation of the superconducting magnet device 10, the heat shield 18 is cooled to a first cooling temperature by the first cooling stage 16*a*. The heat shield 18 can thermally protect low-temperature portions such as the second cooling stage 16*b* of the cryocooler 16 and the superconducting coil 12 which are disposed inside the heat shield 18 and are cooled to a lower temperature than the heat shield 18, from radiant heat from the vacuum chamber 14.

The superconducting coil 12 is thermally coupled to the second cooling stage 16*b* via a heat transfer member 26. The heat transfer member 26 is formed of, for example, a metal material such as copper or another material having a high thermal conductivity, and connects the superconducting coil 12 to the second cooling stage 16*b*. The heat transfer member 26 may be a rigid member that rigidly connects the superconducting coil 12 and the second cooling stage 16*b*, or may flexibly connect the superconducting coil 12 and the second cooling stage 16*b* to allow relative displacement between them. Alternatively, the superconducting coil 12 may be directly attached to the second cooling stage 16*b* and thermally coupled to the second cooling stage 16*b*. During the operation of the superconducting magnet device 10, the superconducting coil 12 is cooled to the second cooling temperature by the second cooling stage 16*b*.

The electric current introduction line 20 includes an external wire 20*a*, a feedthrough portion 20*b*, an outer current lead portion 20*c*, and an inner current lead portion 20*d*, and forms an electric current path from the excitation power supply 24 to the superconducting coil 12. Typically, one electric current introduction line 20 on a positive electrode side and one electric current introduction line 20 on a negative electrode side are provided.

The external wire 20*a* disposed outside the vacuum chamber 14 connects the excitation power supply 24 to the feedthrough portion 20*b* provided in a wall portion of the vacuum chamber 14. The external wire 20*a* may be an appropriate power supply cable. The feedthrough portion 20*b* is an airtight terminal for introducing a current into the vacuum chamber 14, and connects the external wire 20*a* to an internal wire (that is, the outer current lead portion 20*c* and the inner current lead portion 20*d*) in the vacuum chamber 14. The electric current introduction line 20 can penetrate the wall portion of the vacuum chamber 14 while maintaining the airtightness of the vacuum chamber 14 by means of the feedthrough portion 20*b*.

The outer current lead portion 20*c* is disposed outside the heat shield 18 within the vacuum chamber 14 and connects the feedthrough portion 20*b* to the inner current lead portion 20*d*. The outer current lead portion 20*c* is formed of, for example, a metal material having excellent conductivity and represented by pure copper such as oxygen-free copper. An end portion of the outer current lead portion 20*c* connected to the inner current lead portion 20*d* is thermally coupled to the heat shield 18. The end portion of the outer current lead portion 20*c* is fixed to the heat shield 18 or is connected to the heat shield 18 through an appropriate heat transfer member to be cooled to the first cooling temperature, similarly to the heat shield 18. However, the outer current lead portion 20*c* is in a state of being electrically insulated from the heat shield 18. For example, the outer current lead portion 20*c* may be attached to a fixation portion, such as the heat shield 18 or the heat transfer member, such that an insulating material (for example, a sheet of an insulating resin material) is interposed between the outer current lead portion 20*c* and the fixation portion.

The inner current lead portion 20*d* is disposed inside the heat shield 18 and connects the outer current lead portion 20*c* to the superconducting coil 12. The inner current lead portion 20*d* may include a first terminal 20*d*1, a second terminal 20*d*2, and a high-temperature superconducting current lead 20*d*3 connecting these two terminals. The first terminal 20*d*1 is connected to the outer current lead portion 20*c*, and the second terminal 20*d*2 is connected to the superconducting coil 12. The first terminal 20*d*1 is thermally coupled to the heat shield 18, and is cooled to the first cooling temperature similarly to the heat shield 18. The second terminal 20*d*2 is cooled to the second cooling temperature similarly to the superconducting coil 12.

The high-temperature superconducting current lead 20*d*3 may be formed of, for example, a copper oxide superconductor or another high-temperature superconducting material. The material of such a high-temperature superconducting current lead has thermal insulation properties. Therefore, compared to a case where the inner current lead portion 20*d* is made of metal, it is possible to reduce the heat that can be transferred from the quenching protection circuit 22 to the superconducting coil 12 by using the inner current lead portion 20*d* as a heat transfer path. This reduces the heat load on the second cooling stage 16*b* of the cryocooler 16 and can contribute to good cooling of the superconducting coil 12.

The quenching protection circuit 22 is connected in parallel to the superconducting coil 12. The quenching protection circuit 22 has one end connected to the electric current introduction line 20 on one side (for example, the positive electrode side) and the other end connected to the electric current introduction line 20 on the other side (for example, the negative electrode side), whereby the quenching protection circuit 22 is connected in parallel to the superconducting coil 12. For example, the quenching protection circuit 22 may be connected to the electric current introduction line 20 by using a busbar formed of a metal material having excellent conductivity such as copper.

The quenching protection circuit 22 can generate heat by being energized, and may include a general linear resistance element (that is, according to Ohm's law), or may include a non-linear resistor. The non-linear resistor may have a non-linear characteristic in which the resistance value is high when the voltage applied to the non-linear resistor is small and the resistance value is low when the voltage applied to the non-linear resistor is large (the non-linear resistor may have a first resistance value when the voltage applied to the non-linear resistor is a first value, and have a second resistance value that is less than the first resistance value when the voltage applied to the non-linear resistor is a second value that is greater than the first value).

The non-linear resistor may be, for example, a rectifying element such as a diode or a thyristor. In this embodiment, the quenching protection circuit 22 includes a diode 28 as an example. Thus, alternatively, the non-linear resistor may be a varistor. The quenching protection circuit 22 may include both a linear resistor and a non-linear resistor, and, for example, these may be connected in series.

Unlike an existing typical quenching protection circuit including a pair of diodes connected in parallel with opposite polarities to each other, in this embodiment, the quenching protection circuit 22 allows current only in one direction, which is the forward direction of the diode 28, and blocks current in the reverse direction. Such a quenching protection circuit 22 is advantageous in reducing the cost of the superconducting magnet device 10 as compared with the existing quenching protection circuit. This is because a single diode 28 is used instead of the pair of diodes, so that the number of diodes used in the quenching protection circuit 22 can be halved. Since diodes that are guaranteed to operate at cryogenic temperatures are more expensive than general-purpose diodes that are not guaranteed to do so, reducing the number of diodes used greatly contributes to cost reduction.

As described above, the quenching protection circuit 22 is cooled to a higher cooling temperature than the superconducting coil 12 during the operation of the superconducting coil 12. The quenching protection circuit 22 may be thermally coupled to the first cooling stage 16*a* of the cryocooler 16 and cooled to the first cooling temperature. In FIG. 2, for convenience, a first portion cooled to the first cooling temperature is shown surrounded by a broken line 30, and a second portion cooled to the second cooling temperature is shown surrounded by a broken line 32. As shown in the illustrated example, the quenching protection circuit 22 may be connected between the outer current lead portions 20*c*, and may be installed at a portion cooled to the first cooling temperature, for example, the heat shield 18. The quenching protection circuit 22 may be connected to the superconducting coil 12 via the inner current lead portion 20*d* (that is, the high-temperature superconducting current lead 20*d*3).

When the temperature rise of the superconducting coil 12 accompanying the quenching is large, the time required for recooling for recovery is extended, that is, the downtime of the superconducting magnet device 10 can be increased. In the existing design, the protection circuit of the superconducting coil is likely to be cooled to the same temperature as the superconducting coil. In this embodiment, since the quenching protection circuit 22 is cooled to a cooling temperature higher than that of the superconducting coil 12, compared to the existing design in which such a protection circuit is cooled to the same temperature (that is, a second cooling temperature) as the superconducting coil, recooling can be performed in a shorter time. It is possible to shorten the time required for the superconducting magnet device 10 to recover from quenching.

Since the quenching protection circuit 22 is cooled by the first cooling stage 16*a* of the cryocooler 16, the heat generated by the quenching protection circuit 22 can be efficiently removed. This is because, in general, the cooling capacity of the first stage of the cryocooler 16 is larger than that of the second stage (for example, several tens of times), and there is a relatively large margin. This is also advantageous in shortening the time required for the superconducting magnet device 10 to recover from quenching.

When the quenching protection circuit 22 is connected to the superconducting coil 12 via the high-temperature superconducting current lead 20*d*3, the heat transfer path passes through the inner current lead portion 20*d* as compared with the case where the inner current lead portion 20*d* is made of metal. As a result, the heat that can be transferred from the quenching protection circuit 22 to the superconducting coil 12 can be reduced. This reduces the heat load on the second cooling stage 16*b* of the cryocooler 16 and can contribute to good cooling of the superconducting coil 12.

As shown in FIG. 2, the superconducting coil 12 is divided into a plurality of (for example, N, N is any natural number) superconducting coil portions 12*a*_1 to 12*a* N, and these superconducting coil portions 12*a* may be connected in series. The quenching protection circuit 22 includes a plurality of diodes 28, and each of the plurality of diodes 28 is connected in parallel to the corresponding superconducting coil portion 12*a* of the plurality of superconducting coil portions 12*a*. The high-temperature superconducting current lead 20*d*3 connects each diode 28 to the corresponding superconducting coil portion 12*a*. Compared to a non-divided coil configuration, such a divided coil configuration can reduce the voltage applied to both ends of the superconducting coil 12 when quenching occurs, which is particularly advantageous when the superconducting coil 12 has a large size.

In addition, the superconducting magnet device 10 may have a plurality of superconducting coils 12, and in this case, the quenching protection circuit 22 may be provided for each superconducting coil 12. That is, a plurality of quenching protection circuits 22 may be provided, and each quenching protection circuit 22 may be connected in parallel to the corresponding superconducting coil 12 among the plurality of superconducting coils 12. Each of the plurality of superconducting coils 12 may be divided into a plurality of superconducting coil portions 12*a*.

In this embodiment, due to the design of the superconducting magnet device 10, the direction of the current flowing through the superconducting coil 12 by the excitation power supply 24 is predetermined such that the current does not flow in the quenching protection circuit 22 during the normal operation of the superconducting magnet device 10. The direction of the current supplied to the superconducting coil 12 by the excitation power supply 24 is fixed to one direction. The excitation power supply 24 in which the direction of the current is fixed in this manner may be adopted in some applications of the superconducting magnet device 10 such as a single crystal pulling device. As illustrated by an arrow 34 in FIG. 2, the direction of the current flowing from the excitation power supply 24 to the superconducting coil 12 is the reverse direction of the diode 28 of the quenching protection circuit 22. Therefore, this current is blocked by the diode 28 and does not flow to the quenching protection circuit 22.

On the other hand, when quenching occurs during the operation of the superconducting coil 12, the electrical connection between the excitation power supply 24 and the superconducting coil 12 is cut off, and a current from the superconducting coil 12 flows through the quenching protection circuit 22. The direction of this current corresponds to the forward direction of the diode 28 as illustrated by an arrow 36 in FIG. 2. Therefore, a current can flow from the superconducting coil 12 to the quenching protection circuit 22, and at least a portion of the electromagnetic energy stored in the superconducting coil 12 can be converted into heat and consumed by the quenching protection circuit 22. In this way, energy is extracted from the superconducting coil 12 by the quenching protection circuit 22, whereby the superconducting coil 12 can be protected when quenching occurs. Since the energy of the superconducting coil 12 is reduced, it is possible to prevent or reduce damage to the superconducting coil 12 and the periphery thereof which may be caused by the reduction.

Figure 3:
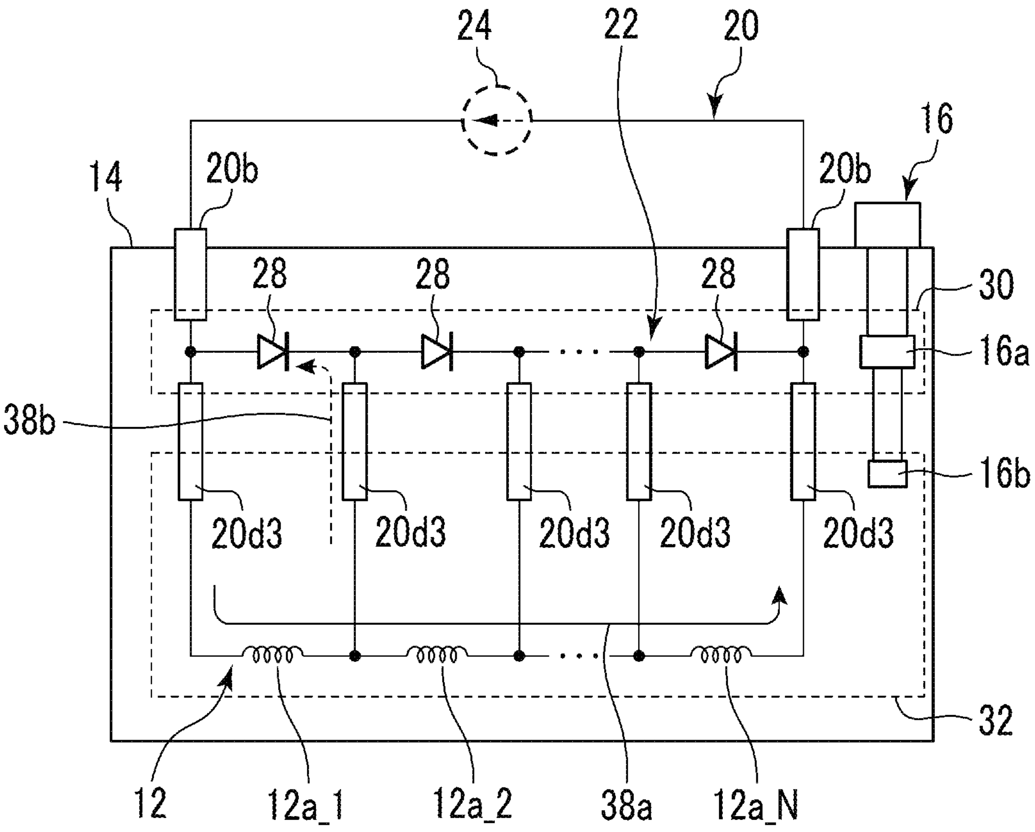
FIG. 3 is a diagram schematically showing incorrect connection of the excitation power supply in the superconducting magnet device according to the embodiment.

FIG. 3 is a diagram schematically showing incorrect connection of the excitation power supply 24 in the superconducting magnet device 10 according to the embodiment. As described at the beginning of this document, the present inventor realizes that there is a risk of incorrectly connecting the superconducting coil 12 and the excitation power supply 24 with opposite polarities, when these are connected, such as when the superconducting magnet device 10 is manufactured or installed at a site where the superconducting magnet device is used. In FIG. 3, the excitation power supply 24 connected in an opposite direction in this way is illustrated by a broken line.

When such incorrect connection is made, a current flows through the superconducting coil 12 in a direction opposite to the correct direction in the normal operation, as illustrated by an arrow 38*a* in FIG. 3. Then, when quenching occurs, a current flowing from the superconducting coil 12 toward the diode tends to flow in the reverse direction of the diode, as illustrated by an arrow 38*b* in FIG. 3. That is, as a result of the incorrect connection, the operation of the quenching protection circuit 22 may be hindered. When the quenching protection circuit 22 does not operate, as described above, there is an increased risk of damage to the superconducting magnet device 10 when quenching occurs, which is undesirable.

Therefore, in this document, some solutions for coping with the incorrect connection of the polarity between the superconducting coil 12 and the excitation power supply 24 are proposed below.

Figure 4A:
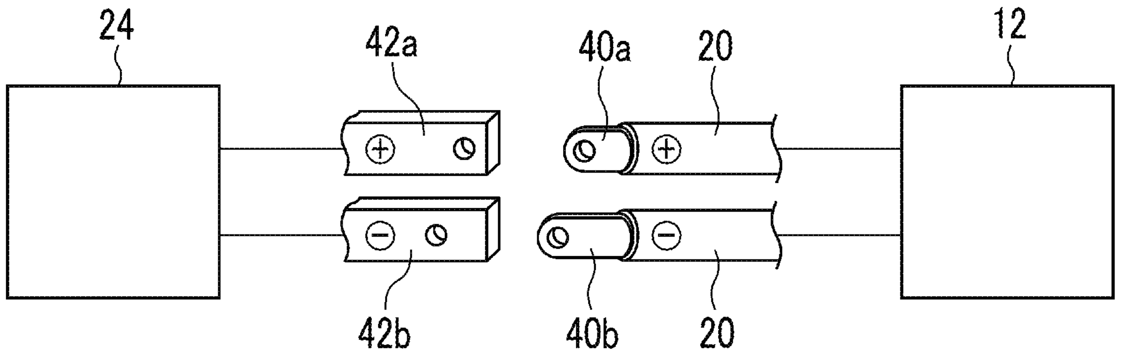
FIGS. 4A to 4C are diagrams schematically showing an example of electrical connection between the excitation power supply and a superconducting coil according to the embodiment.
Figure 4B:
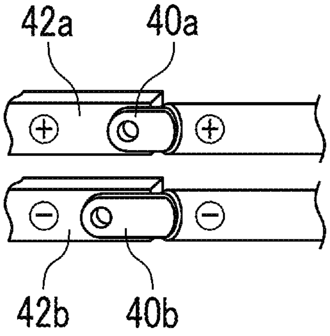
Figure 4C:
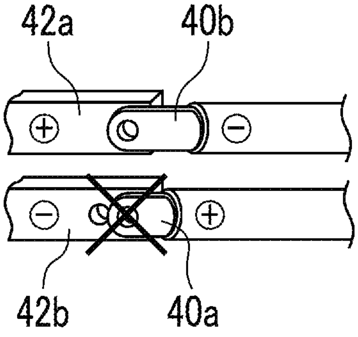

FIGS. 4A to 4C are diagrams schematically showing an example of electrical connection between the excitation power supply 24 and the superconducting coil 12 according to the embodiment. FIG. 4A shows a state before the excitation power supply 24 and the superconducting coil 12 are connected, and FIG. 4B shows a state in which the excitation power supply 24 and the superconducting coil 12 are correctly connected to each other with proper polarity. FIG. 4C shows a state in which the excitation power supply 24 and the superconducting coil 12 are incorrectly connected to each other with a polarity opposite to the proper polarity.

As described above, the superconducting coil 12 is connected to the excitation power supply 24 by the electric current introduction line 20. As shown in FIG. 4A, the positive-side current introduction line 20 has a coil-side positive terminal 40*a* at the end, and the negative-side current introduction line 20 has a coil-side negative terminal 40*b* at the end. A set of coil-side terminals are connected to the superconducting coil 12 by the electric current introduction lines 20. The excitation power supply 24 includes a power supply-side positive terminal 42*a* connected to the coil-side positive terminal 40*a* and a power supply-side negative terminal 42*b* connected to the coil-side negative terminal 40*b*. The coil-side terminals and the power supply-side terminals are coupled so as to be electrically connectable by, for example, fastening, crimping, or another appropriate fixing method.

The coil-side positive terminal 40*a* is configured to be disconnected from the power supply-side negative terminal 42*b*, and the coil-side negative terminal 40*b* is configured to be disconnected from the power supply-side positive terminal 42*a*. As an example of such a disconnection configuration, the shapes of the coil-side positive terminal 40*a* and the coil-side negative terminal 40*b* may be different from each other, and the shapes of the power supply-side positive terminal 42*a* and the power supply-side negative terminal 42*b* may be different from each other in response to the difference in the shapes of the coil-side positive terminal 40*a* and the coil-side negative terminal 40*b*.

For example, as illustrated, the coil-side positive terminal 40*a* and the coil-side negative terminal 40*b* may have different terminal lengths, and correspondingly, the power supply-side positive terminal 42*a* and the power supply-side negative terminal 42*b* also may have different terminal lengths. In other words, the coil-side positive terminal 40*a* and the power supply-side positive terminal 42*a* may have the same terminal length, the coil-side negative terminal 40*b* and the power supply-side negative terminal 42*b* may have the same terminal length, and the positive-side terminal length and the negative-side terminal length may be different from each other.

Therefore, as shown in FIG. 4B, due to the compatibility of the terminal shapes, the coil-side positive terminal 40*a* and the power supply-side positive terminal 42*a* can be connected to each other and the coil-side negative terminal 40*b* and the power supply-side negative terminal 42*b* can be connected to each other. In this way, the excitation power supply 24 and the superconducting coil 12 can be correctly connected to each other with the proper polarity.

However, as shown in FIG. 4C, when a worker incorrectly tries to connect the excitation power supply 24 and the superconducting coil 12 with a polarity opposite to the proper polarity, due to the incompatibility of the terminal shapes, the coil-side terminal and the power supply-side terminal cannot be connected to each other on at least one of the positive electrode side and the negative electrode side (in the illustrated example, the positive electrode side).

In this way, incorrect connection between the excitation power supply 24 and the electric current introduction line 20 (and thus, the superconducting coil 12) can be physically prevented. Accordingly, it is possible to avoid the risk that the quenching protection circuit 22 does not operate as a result of the incorrect connection. A single diode 28 can be used in the quenching protection circuit 22 instead of a pair of diodes connected to each other in opposite directions, and the cost of the superconducting magnet device 10 can be reduced.

Figure 5A:
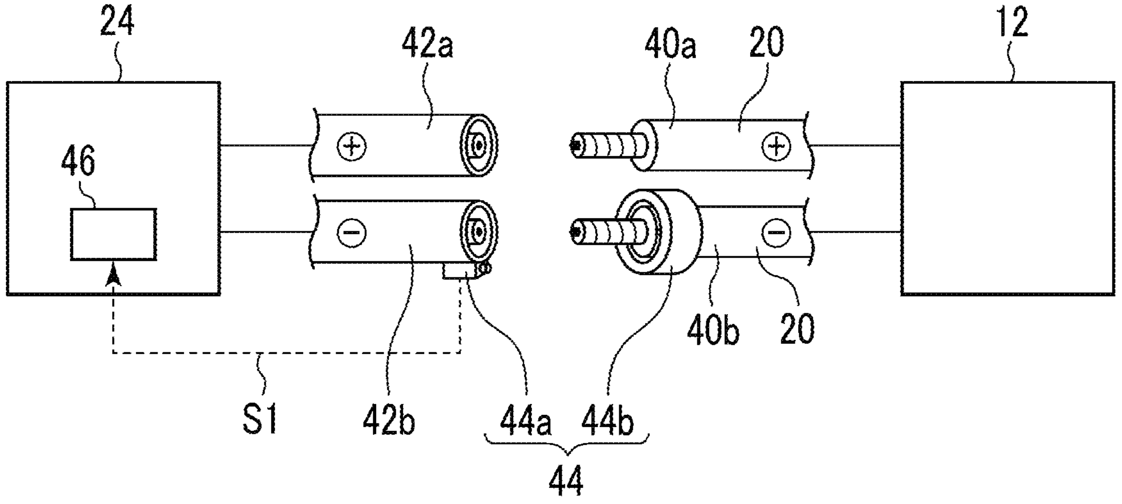
FIGS. 5A to 5C are diagrams schematically showing another example of electrical connection between the excitation power supply and the superconducting coil according to the embodiment.
Figure 5B:
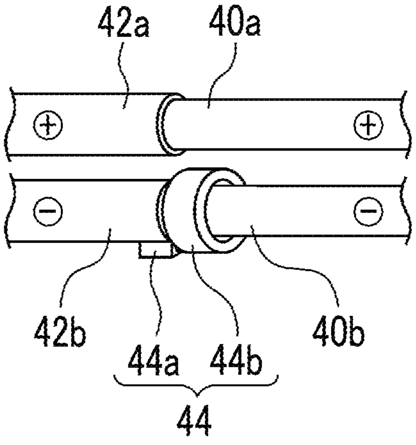
Figure 5C:
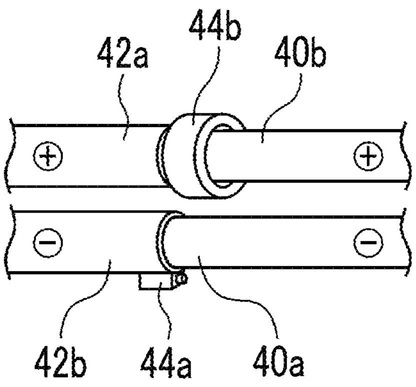

FIGS. 5A to 5C are diagrams schematically showing another example of electrical connection between the excitation power supply 24 and the superconducting coil 12 according to the embodiment. FIG. 5A shows a state before the excitation power supply 24 and the superconducting coil 12 are connected, and FIG. 5B shows a state in which the excitation power supply 24 and the superconducting coil 12 are correctly connected to each other with the proper polarity. FIG. 5C shows a state in which the excitation power supply 24 and the superconducting coil 12 are incorrectly connected to each other with a polarity opposite to the proper polarity.

Similarly to the above-described example, a set of coil-side terminals (the coil-side positive terminal 40*a* and the coil-side negative terminal 40*b*) are provided in the electric current introduction line 20, and a set of power supply-side terminals (the power supply-side positive terminal 42*a* and the power supply-side negative terminal 42*b*) are provided in the excitation power supply 24. The coil-side positive terminal 40*a* and the power supply-side positive terminal 42*a* are connected, and the coil-side negative terminal 40*b* and the power supply-side negative terminal 42*b* are connected, whereby the superconducting coil 12 is connected to the excitation power supply 24 by the electric current introduction line 20. In this example, these terminals can be connected to each other by inserting the coil-side terminal into the power supply-side terminal.

As illustrated, a detector 44 is provided that generates a detection signal S1 representing whether the set of coil-side terminals and the set of power supply-side terminals are connected to each other with the proper polarity or the opposite polarity. In this example, the detector 44 may be configured to generate the detection signal S1 when the coil-side terminal and the power supply-side terminal are connected to each other with the proper polarity, and to not generate the detection signal S1 when the coil-side terminal and the power supply-side terminal are connected to each other with a polarity opposite to the proper polarity.

As an example, the detector 44 may include a detection signal generator 44*a* provided at the power supply-side terminal (power supply-side negative terminal 42*b* in the illustrated example), and an operation unit 44*b* that operates the detection signal generator 44*a* provided at the coil-side terminal (coil-side negative terminal 40*b* in the illustrated example). The detection signal generator 44*a* may be configured to generate the detection signal S1 when operated by the operation unit 44*b*, and may be, for example, a push button that generates the detection signal S1 in this way. The operation unit 44*b* may be configured to not come into contact with the detection signal generator 44*a* when the power supply-side terminal and the coil-side terminal are not connected, and to come into contact with and operate the detection signal generator 44*a* when both terminals are connected to each other, and may be washer-attached to the terminal. Further, the detection signal generator 44*a* may be provided at the coil-side terminal, and the operation unit 44*b* may be provided at the power supply-side terminal.

The excitation power supply 24 is configured to detect incorrect connection based on the detection signal S1. The excitation power supply 24 is connected to the detector 44 so as to receive the detection signal S1 from the detector 44 (specifically, the detection signal generator 44*a*). Therefore, the excitation power supply 24 can receive the detection signal S1 from the detector 44 and detect the incorrect connection in response to the detection signal S1.

The excitation power supply 24 may include an interlock mechanism 46 built therein as a safety device. When the detection signal S1 represents the correct connection between the excitation power supply 24 and the superconducting coil 12, the excitation power supply 24 may be configured to release the interlock mechanism 46 on condition that the detection signal S1 is received. As such an interlock mechanism 46, a known interlock mechanism can be appropriately adopted. In this manner, the power supply from the excitation power supply 24 to the superconducting coil 12 is permitted when the connection is correct, while the power supply can be prohibited by the interlock mechanism 46 when the connection is erroneous.

In addition, the excitation power supply 24 may be configured to notify a worker that the incorrect connection is detected or the incorrect connection is not detected (that is, the connection is correct) visually or audibly, or by any other appropriate method.

In this example, as shown in FIG. 5B, the coil-side positive terminal 40*a* and the power supply-side positive terminal 42*a* can be connected to each other, and the coil-side negative terminal 40*b* and the power supply-side negative terminal 42*b* can be connected to each other. At this time, the operation unit 44*b* mounted on the coil-side negative terminal 40*b* comes into contact with the detection signal generator 44*a* mounted on the power supply-side negative terminal 42*b* (that is, the washer presses the push button), and the detection signal S1 is generated. The detection signal S1 is input to the excitation power supply 24 from the detector 44. In this case, the excitation power supply 24 releases the interlock mechanism 46 based on the detection signal S1. Further, the excitation power supply 24 may notify the worker that the excitation power supply 24 and the superconducting coil 12 are correctly connected, based on the detection signal S1.

However, as shown in FIG. 5C, when a worker mistakenly connects the excitation power supply 24 and the superconducting coil 12 with a polarity opposite to the proper polarity, the operation unit 44*b* is not provided in the coil-side positive terminal 40*a*, so that the detection signal generator 44*a* of the power supply-side negative terminal 42*b* is not operated. Therefore, the detector 44 does not generate the detection signal S1. In this case, the excitation power supply 24 maintains the interlock by the interlock mechanism 46.

In this way, incorrect connection between the excitation power supply 24 and the electric current introduction line 20 (and thus, the superconducting coil 12) can be detected. Accordingly, even when the connection is incorrectly made once, the connection can be corrected. It is possible to avoid the risk that the quenching protection circuit 22 does not operate as a result of the incorrect connection. A single diode 28 can be used in the quenching protection circuit 22 instead of a pair of diodes connected to each other in opposite directions, and the cost of the superconducting magnet device 10 can be reduced.

The detector 44 is not limited to the contact type detector as described above, and may be a non-contact type detector such as an optical type detector.

It is also possible to detect incorrect connection between the excitation power supply 24 and the superconducting coil 12 by devising a method of changing the current when the excitation power supply 24 excites the superconducting coil 12, instead of or in addition to measures against incorrect connection using the detector 44. Here, the excitation of the superconducting coil 12 is a part of a preparatory stage for a normal operation in which the superconducting magnet device 10 generates a magnetic field, and refers to a process of increasing the coil current supplied from the excitation power supply 24 to the superconducting coil 12 from zero to a predetermined current (for example, the rated current of the superconducting coil 12). An example of such incorrect connection detection will be described below.

Figure 6A:
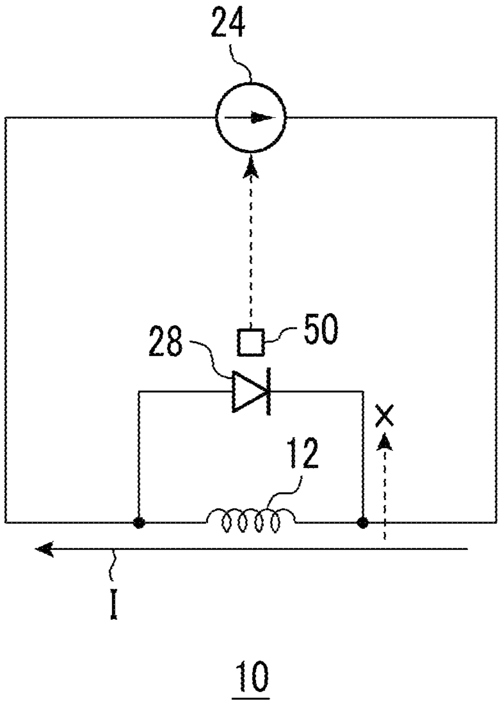
FIGS. 6A and 6B are diagrams schematically showing an example of countermeasures against incorrect connection between the excitation power supply and the superconducting coil according to the embodiment.
Figure 6B:
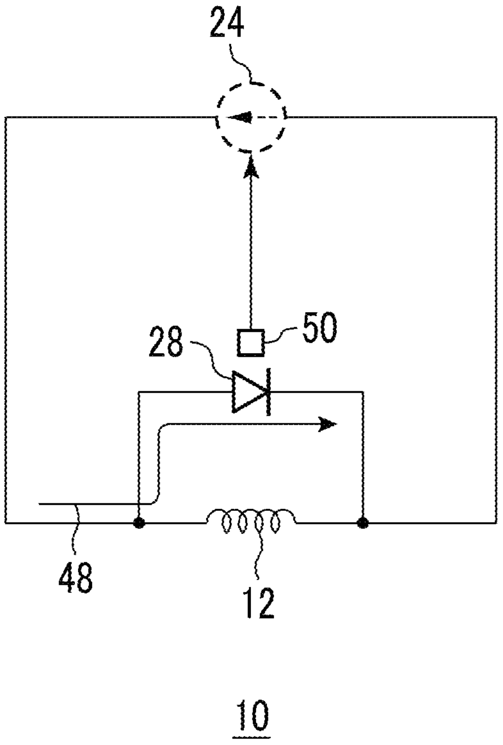

FIGS. 6A and 6B are diagrams schematically showing an example of countermeasures against incorrect connection between the excitation power supply 24 and the superconducting coil 12 according to the embodiment. FIG. 6A shows a state in which the excitation power supply 24 and the superconducting coil 12 are correctly connected to each other with the proper polarity. FIG. 6B shows a state in which the excitation power supply 24 and the superconducting coil 12 are incorrectly connected to each other with a polarity opposite to the proper polarity.

The excitation power supply 24 may be configured to control a current increase rate when the superconducting coil 12 is excited such that an induced electromotive force generated in the superconducting coil 12 or in a portion thereof (for example, the superconducting coil portion 12*a*) according to the current increase rate exceeds a threshold voltage of the rectifying element (for example, the diode 28).

In other words, the excitation power supply 24 may be configured to control the current increase rate (dI/dt) during excitation of the superconducting coil 12 so as to satisfy the following equation.

$$Vf<L(dI/dt)$$

Here, Vf represents the threshold voltage of the rectifying element, and L represents the inductance of the superconducting coil 12 or of the portion thereof connected in parallel to the rectifying element.

As shown in FIG. 6A, when the excitation power supply 24 and the superconducting coil 12 are connected to each other with the proper polarity, a current I from the excitation power supply 24 flows through the superconducting coil 12 during the excitation of the superconducting coil 12 by the excitation power supply 24. Since the direction of the current I is the reverse direction of the diode 28, the current I does not flow through the diode 28.

On the other hand, as shown in FIG. 6B, when the excitation power supply 24 and the superconducting coil 12 are incorrectly connected to each other with a polarity opposite to the proper polarity, the current I from the excitation power supply 24 flows not only to the superconducting coil 12 but also to the diode 28 during the excitation of the superconducting coil 12 by the excitation power supply 24. This is because, as described above, the excitation power supply 24 controls the induced electromotive force L(dI/dt) generated in the superconducting coil 12 to exceed the threshold voltage Vf of the diode 28. At this time, since the direction of the current I is the forward direction of the diode 28, the diode 28 is energized (turned on) by the induced electromotive force L(dI/dt), and the forward current flows through the diode 28 (indicated by an arrow 48 in FIG. 6B).

Therefore, the superconducting magnet device 10 may be provided with a sensor 50 that detects energization of the rectifying element, in this example, the diode 28. For example, the sensor 50 may be a current sensor that measures a current flowing through the rectifying element, for example, a non-contact type current sensor. Alternatively, the sensor 50 may be a magnetic sensor that is disposed in the vicinity of the rectifying element and that measures a magnetic flux. The magnetic sensor can detect a magnetic flux generated when a current flows through the rectifying element. Alternatively, the sensor 50 may be a temperature sensor that measures the temperature of the rectifying element. The temperature sensor can detect a temperature rise in the rectifying element that occurs when a current flows through the rectifying element.

The excitation power supply 24 may be configured to control the current increase rate dI/dt such that the induced electromotive force L(dI/dt) exceeds the threshold voltage Vf of the rectifying element, and to detect incorrect connection based on the output of the sensor 50. For example, the excitation power supply 24 may receive an output thereof from the sensor 50 and compare the output of the sensor 50 with a certain threshold. When the output of the sensor 50 is below the threshold, the excitation power supply 24 may determine that the excitation power supply 24 and the superconducting coil 12 are correctly connected. When the output of the sensor 50 exceeds the threshold, the excitation power supply 24 may determine that the excitation power supply 24 and the superconducting coil 12 are incorrectly connected. It is possible to set a threshold for determination as appropriate based on empirical knowledge of a designer or on experiments and simulations by the designer.

In this way, by setting the current increase rate during excitation of the superconducting coil 12 by the excitation power supply 24 as described above, the incorrect connection between the excitation power supply 24 and the electric current introduction line 20 (and thus, the superconducting coil 12) can be detected. Accordingly, even when the connection is incorrectly made once, the connection can be corrected. It is possible to avoid the risk that the quenching protection circuit 22 does not operate as a result of the incorrect connection. A single diode 28 can be used in the quenching protection circuit 22 instead of a pair of diodes connected to each other in opposite directions, and the cost of the superconducting magnet device 10 can be reduced.

For the sake of simplicity, FIGS. 6A and 6B show one superconducting coil 12 and one rectifying element (diode 28) connected in parallel to the superconducting coil 12. However, as described with reference to FIGS. 1 to 3, the superconducting magnet device 10 may be provided with the plurality of superconducting coils 12 (or a plurality of superconducting coil portions 12*a*) and a plurality of corresponding rectifying elements. Even in this case, the above-described incorrect connection detection method can be similarly applied. That is, the incorrect connection can be detected based on the presence or absence of energization of at least one rectifying element out of the plurality of rectifying elements.

Instead of the sensor 50 described above, the excitation power supply 24 may be configured to measure the voltage at both ends of the excitation power supply 24 and to detect incorrect connection based on the measured voltage at both ends. When the excitation power supply 24 and the superconducting coil 12 are connected to each other with the proper polarity, the excitation power supply 24 measures the voltage corresponding to the induced electromotive force L(dI/dt) as a voltage at both ends of the excitation power supply 24, during the excitation of the superconducting coil 12 by the excitation power supply 24. On the other hand, when the excitation power supply 24 and the superconducting coil 12 are incorrectly connected to each other with a polarity opposite to the proper polarity, the voltage at both ends of the excitation power supply 24 becomes the threshold voltage Vf of the diode 28.

Therefore, a threshold for determination based on the voltage at both ends of the excitation power supply 24 may be preset to a value larger than the threshold voltage Vf of the rectifying element and smaller than the induced electromotive force L(dI/dt). The excitation power supply 24 may measure the voltage at both ends of the excitation power supply 24 and compare the measured voltage at both ends with this threshold, during the excitation of the superconducting coil 12 by the excitation power supply 24. When the voltage at both ends of the excitation power supply 24 exceeds the threshold, it may be determined that the excitation power supply 24 and the superconducting coil 12 are correctly connected. When the voltage at both ends of the excitation power supply 24 is below the threshold, it may be determined that the excitation power supply 24 and the superconducting coil 12 are incorrectly connected.

When the plurality of superconducting coils 12 (or a plurality of superconducting coil portions 12*a*) are provided, the threshold for determination may be greater than the sum of threshold voltages of a plurality of corresponding rectifying elements (ΣVf, for example, when N rectifying elements with the same threshold voltage are provided, N×Vf) and may be smaller than the sum of the induced electromotive forces (ΣL(dI/dt)).

The excitation power supply 24 may be configured to be stopped when the measured voltage at both ends is below a voltage lower limit value. For example, the excitation power supply 24 may include the interlock mechanism 46 (refer to FIG. 5A), and the interlock mechanism 46 may stop the excitation power supply 24 when the voltage at both ends of the excitation power supply 24 is below the voltage lower limit value.

In this case, the excitation power supply 24 may be configured to control the current increase rate dI/dt such that the induced electromotive force (L(dI/dt) or ΣL(dI/dt)) exceeds the voltage lower limit value, to measure the voltage at both ends of the excitation power supply 24, and to detect incorrect connection based on the measured voltage at both ends. The voltage lower limit value may be preset so as to exceed the threshold voltage (Vf or ΣVf) of the rectifying element.

In this manner, when the excitation power supply 24 and the superconducting coil 12 are correctly connected, the voltage at both ends of the excitation power supply 24 exceeds the voltage lower limit value, so that the interlock by the interlock mechanism 46 is not activated, and the superconducting coil 12 can be excited. On the other hand, in the case of incorrect connection, since the voltage at both ends of the excitation power supply 24 is below the voltage lower limit value, the interlock by the interlock mechanism 46 is activated, and the excitation of the superconducting coil 12 by the excitation power supply 24 can be stopped.

Depending on the type or design of the superconducting coil 12, the current increase rate immediately after the start of excitation may be small (or may need to be small). In order to avoid incorrectly determining this situation as incorrect connection, the excitation power supply 24 may disable the voltage lower limit value (or the interlock mechanism 46) when the current increase rate is below a certain level. In this case, the excitation power supply 24 may enable the voltage lower limit value (or the interlock mechanism 46), at a stage where the current increase rate increases to some extent.

Even in this manner, incorrect connection between the excitation power supply 24 and the electric current introduction line 20 (and thus, the superconducting coil 12) can be detected. Accordingly, even when the connection is incorrectly made once, the connection can be corrected. It is possible to avoid the risk that the quenching protection circuit 22 does not operate as a result of the incorrect connection. A single diode 28 can be used in the quenching protection circuit 22 instead of a pair of diodes connected to each other in opposite directions, and the cost of the superconducting magnet device 10 can be reduced.

The present invention has been described above based on the examples. It will be understood by those skilled in the art that the present invention is not limited to the embodiment, various design changes are possible, various modification examples are possible, and such modification examples are also within the scope of the present invention. Various features described in relation to the certain embodiment are also applicable to other embodiments. A new embodiment resulting from combination has the effects of each of the combined embodiments.

The above-described embodiment has been described as an example of a case where the cryocooler 16 is a GM cryocooler, but the present invention is not limited thereto. In an embodiment, the cryocooler 16 may be another type of two-stage type cryocooler having a first cooling stage 16*a* and a second cooling stage 16*b*, for example, a Solvay cryocooler, a Stirling cryocooler, a pulse tube cryocooler, or the like.

In FIG. 1, one cryocooler 16 is shown as an example. However, for example, in a case where the superconducting coil 12 has a large size, the superconducting magnet device 10 may include a plurality of cryocoolers 16 for cooling a single same superconducting coil 12 as necessary.

In the above-described embodiment, the superconducting magnet device 10 is configured as a so-called conduction cooling type in which the superconducting coil 12 is directly cooled by the cryocooler 16, instead of as an immersion cooling type in which the superconducting coil 12 is immersed in a cryogenic liquid refrigerant such as liquid helium. However, the superconducting magnet device 10 may be of an immersion cooling type. In this case, the superconducting coil 12 may be cooled by being immersed in a cryogenic liquid such as liquid helium, and the quenching protection circuit 22 may be cooled by using a refrigerant (for example, liquid nitrogen) having a higher boiling point. In this way, the quenching protection circuit 22 may be cooled to a cooling temperature higher than that of the superconducting coil 12 during the operation of the superconducting coil 12.

In the above-described embodiment, a case where the quenching protection circuit 22 is thermally coupled to the first cooling stage 16*a* of the cryocooler 16 and is cooled to the first cooling temperature has been described as an example, but the present invention is not limited to this. The quenching protection circuit 22 may be thermally coupled to the second cooling stage 16*b* of the cryocooler 16 and cooled to the second cooling temperature. Alternatively, the quenching protection circuit 22 may be disposed in an ambient environment outside the vacuum chamber 14 and may have an ambient temperature (for example, room temperature).

Although the present invention has been described using specific words and phrases based on the embodiment, the embodiment merely shows one aspect of the principle and application of the present invention, and various modifications and improvements can be made within the scope of the present invention described in claims.

It should be understood that the invention is not limited to the above-described embodiment, but may be modified into various forms on the basis of the spirit of the invention. Additionally, the modifications are included in the scope of the invention.

What is claimed is:

1. A superconducting magnet device comprising:
- a superconducting coil;
- a quenching protection circuit that is connected in parallel to the superconducting coil and that allows a current in one direction; and
- an excitation power supply that is connected to the superconducting coil with proper polarity determined such that a current flows in the one direction to the quenching protection circuit when quenching occurs in the superconducting coil, and excites the superconducting coil, wherein
- the excitation power supply is configured to detect incorrect connection with the superconducting coil when the excitation power supply is connected to the superconducting coil with a polarity opposite to the proper polarity.

2. The superconducting magnet device according to claim 1, wherein
- the quenching protection circuit includes a rectifying element connected in parallel to the superconducting coil or to a portion thereof, and
- the excitation power supply is configured to control a current increase rate when the superconducting coil is excited such that an induced electromotive force generated in the superconducting coil or in the portion thereof according to the current increase rate exceeds a threshold voltage of the rectifying element.

3. The superconducting magnet device according to claim 2, further comprising:
- a sensor that detects energization of the rectifying element, wherein
- the excitation power supply is configured to control the current increase rate such that the induced electromotive force exceeds the threshold voltage of the rectifying element, and to detect the incorrect connection based on an output of the sensor.

4. The superconducting magnet device according to claim 2, wherein
- the excitation power supply is configured to control the current increase rate such that the induced electromotive force exceeds the threshold voltage of the rectifying element, to measure a voltage at both ends of the excitation power supply, and to detect the incorrect connection based on the voltage at both of the ends.

5. The superconducting magnet device according to claim 4, wherein
- the excitation power supply is configured to be stopped when the measured voltage at the both ends is below a voltage lower limit value,
- the excitation power supply is configured to control the current increase rate such that the induced electromotive force exceeds the voltage lower limit value, to measure the voltage at the both ends of the excitation power supply, and to detect the incorrect connection based on the measured voltage at the both ends, and
- the voltage lower limit value is preset so as to exceed the threshold voltage of the rectifying element.

6. The superconducting magnet device according to claim 1, wherein
- a set of coil-side terminals connected to the superconducting coil is provided,
- the excitation power supply includes a set of power supply-side terminals connected to the set of coil-side terminals,
- the superconducting magnet device further comprises a detector that generates a detection signal representing whether the set of coil-side terminals and the set of power supply-side terminals are connected to each other with the proper polarity or the opposite polarity, and
- the excitation power supply is configured to detect the incorrect connection based on the detection signal.

7. A superconducting magnet device comprising:
- a superconducting coil;
- a quenching protection circuit that is connected in parallel to the superconducting coil and that allows a current in one direction;

an excitation power supply that is connected to the superconducting coil with proper polarity determined such that a current flows in one direction to the quenching protection circuit when quenching occurs in the superconducting coil, and excites the superconducting coil; and a coil-side positive terminal and a coil-side negative terminal connected to the superconducting coil, wherein the excitation power supply includes a power supply-side positive terminal connected to the coil-side positive terminal and a power supply-side negative terminal connected to the coil-side negative terminal, the coil-side positive terminal is configured to be disconnected from the power supply-side negative terminal, and the coil-side negative terminal is configured to be disconnected from the power supply-side positive terminal.

* * * * *